(12) United States Patent
Amm et al.

(10) Patent No.: US 9,639,178 B2
(45) Date of Patent: May 2, 2017

(54) OPTICAL STYLUS (75) Inventors: David Amm, Morgan Hill, CA (US);
David I. Simon, San Francisco, CA (US); Omar Sze Leung, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 441 days.

(21) Appl. No.: 12/950,848

(22) Filed: Nov. 19, 2010

(65) Prior Publication Data
US 2012/0127110 A1     May 24, 2012

(51) Int. Cl.
*G06F 3/0354*     (2013.01)

(52) U.S. Cl.
CPC ................. *G06F 3/03545* (2013.01)

(58) Field of Classification Search
CPC ............. G06F 3/03545; G06F 3/04883; G06F 3/0317; G06F 1/1626; G06F 3/044; G06F 3/0412; G06F 3/0416; G06K 9/222
USPC .................................................. 345/173, 175
See application file for complete search history.

(56) References Cited

U.S. PATENT DOCUMENTS

| | | | |
|---|---|---|---|
| 4,318,096 A | 3/1982 | Thornburg et al. | |
| 4,695,680 A | 9/1987 | Kable | |
| 4,761,089 A | 8/1988 | Kurihara et al. | |
| 4,814,552 A | 3/1989 | Stefik et al. | |
| 4,859,080 A | 8/1989 | Titus et al. | |
| 4,883,926 A | 11/1989 | Baldwin | |
| 5,247,137 A | 9/1993 | Eppeerson | |
| 5,434,371 A | 7/1995 | Brooks | |
| 5,581,052 A | 12/1996 | Padula et al. | |
| 5,600,348 A | 2/1997 | Bartholow et al. | |
| 5,736,687 A | 4/1998 | Sellers | |
| 5,831,601 A | 11/1998 | Vogeley et al. | |
| 5,914,708 A | 6/1999 | LaGrange et al. | |
| 6,050,735 A | 4/2000 | Hazzard | |
| 6,081,261 A * | 6/2000 | Wolff et al. .................... 345/179 |
| 6,130,666 A | 10/2000 | Persidsky | |
| 6,188,392 B1 | 2/2001 | O'Connor et al. | |
| 6,211,521 B1 * | 4/2001 | Bawolek ................ G02B 5/201 |
| | | | 250/208.1 |
| 6,650,320 B1 | 11/2003 | Zimmerman | |
| 6,717,073 B2 | 4/2004 | Xu et al. | |

(Continued)

FOREIGN PATENT DOCUMENTS

| | | |
|---|---|---|
| GB | 2445362 | 7/2008 |
| KR | 20030035305 | 5/2003 |

OTHER PUBLICATIONS

"Birefringence in Liquid Crystals", Sharp: Microelectronics of the Americas, http://www.sharpsma.com/lcds/lcd-reference-information/birefringence-in-liquid-crystals.*

*Primary Examiner* — Ilana Spar
*Assistant Examiner* — Mihir K Rayan
(74) *Attorney, Agent, or Firm* — Zachary D. Hadd; Kendall W. Abbasi (57) ABSTRACT

An optical stylus and host computing system is provided, as are methods related to the operation thereof. In particular, in an example embodiment, a method of operating the optical stylus is provided that includes determining when the optical stylus is in contact with a surface based on signals received by a processor from a pressure sensor of the optical stylus and capturing an image while the optical stylus is in contact with the surface using a camera of the optical stylus. The captured image is then transmitted to a host system.

14 Claims, 9 Drawing Sheets

(56) References Cited

U.S. PATENT DOCUMENTS

| | | |
|---|---|---|
| 6,914,596 B2 | 7/2005 | Liu et al. |
| 6,924,791 B1* | 8/2005 | Nicolas ................. G06F 1/1626 |
| | | 178/18.01 |
| 6,933,933 B2 | 8/2005 | Fleming |
| 7,027,041 B2 | 4/2006 | Nishimura et al. |
| 7,064,750 B2 | 6/2006 | Duret |
| 7,068,262 B2 | 6/2006 | Perkins et al. |
| 7,131,724 B2 | 11/2006 | King et al. |
| 7,310,091 B2 | 12/2007 | Liu et al. |
| 7,365,735 B2 | 4/2008 | Reinhardt et al. |
| 7,477,242 B2 | 1/2009 | Cross et al. |
| 7,489,308 B2 | 2/2009 | Blake et al. |
| 7,511,705 B2 | 3/2009 | Silk et al. |
| 7,612,767 B1 | 11/2009 | Griffin et al. |
| 7,646,379 B1 | 1/2010 | Drennan et al. |
| 7,671,837 B2 | 3/2010 | Forsblad et al. |
| 7,842,893 B2 | 11/2010 | Tomiya |
| 7,976,226 B2 | 7/2011 | Jeon et al. |
| 8,063,322 B2 | 11/2011 | Katsurahira |
| 8,089,474 B2 | 1/2012 | Geaghan et al. |
| 8,094,325 B2 | 1/2012 | Silverbrook |
| 8,130,212 B2 | 3/2012 | Umeda |
| 8,212,795 B2 | 7/2012 | Henry et al. |
| 8,259,090 B2 | 9/2012 | Chiang et al. |
| 2002/0048404 A1* | 4/2002 | Fahraeus et al. ............ 382/188 |
| 2002/0067350 A1 | 6/2002 | Ben Ayed |
| 2002/0158854 A1 | 10/2002 | Ju |
| 2002/0181744 A1* | 12/2002 | Vablais et al. ................ 382/107 |
| 2003/0214490 A1* | 11/2003 | Cool ............................. 345/179 |
| 2004/0140962 A1 | 7/2004 | Wang et al. |
| 2005/0099405 A1* | 5/2005 | Dietz ................. G06F 3/03542 |
| | | 345/179 |
| 2005/0110777 A1 | 5/2005 | Geaghan et al. |
| 2005/0110778 A1* | 5/2005 | Ben Ayed .................... 345/179 |
| 2005/0156915 A1 | 7/2005 | Fisher |
| 2005/0162411 A1 | 7/2005 | van Berkel |
| 2005/0206628 A1 | 9/2005 | Bich et al. |
| 2006/0087496 A1 | 4/2006 | Maciejewski |
| 2006/0123362 A1* | 6/2006 | Keely ........................... 715/857 |
| 2006/0139338 A1* | 6/2006 | Robrecht ............. G06F 3/0488 |
| | | 345/175 |
| 2006/0140480 A1* | 6/2006 | Seto et al. .................... 382/187 |
| 2007/0076953 A1* | 4/2007 | Gonzalez et al. ............ 382/188 |
| 2007/0085842 A1* | 4/2007 | Pilu .............................. 345/179 |
| 2007/0104372 A1* | 5/2007 | Wang et al. .................. 382/182 |
| 2007/0123165 A1* | 5/2007 | Sheynman et al. .......... 455/41.2 |
| 2007/0188477 A1 | 8/2007 | Rehm |
| 2007/0236474 A1 | 10/2007 | Ramstein |
| 2007/0285405 A1 | 12/2007 | Rehm |
| 2008/0036734 A1 | 2/2008 | Forsblad et al. |
| 2008/0036926 A1* | 2/2008 | Chen ................... G02F 1/13338 |
| | | 349/1 |
| 2008/0074401 A1* | 3/2008 | Chung et al. ................. 345/175 |
| 2008/0150917 A1 | 6/2008 | Libbey et al. |
| 2008/0150921 A1 | 6/2008 | Robertson et al. |
| 2008/0278443 A1 | 11/2008 | Schelling et al. |
| 2008/0309621 A1 | 12/2008 | Aggarwal et al. |
| 2009/0009489 A1 | 1/2009 | Lee |
| 2009/0032313 A1 | 2/2009 | Silverbrook et al. |
| 2009/0036176 A1 | 2/2009 | Ure |
| 2009/0115431 A1 | 5/2009 | Philipp |
| 2009/0167702 A1* | 7/2009 | Nurmi ........................... 345/173 |
| 2009/0236153 A1 | 9/2009 | Kyung et al. |
| 2009/0251338 A1* | 10/2009 | Marggraff et al. ............. 341/20 |
| 2009/0273585 A1* | 11/2009 | De Haan .............. G06F 3/03545 |
| | | 345/179 |
| 2009/0314552 A1 | 12/2009 | Underwood et al. |
| 2010/0006350 A1 | 1/2010 | Elias |
| 2010/0051356 A1 | 3/2010 | Stern et al. |
| 2010/0170726 A1 | 7/2010 | Yeh et al. |
| 2010/0271312 A1 | 10/2010 | Alameh et al. |
| 2010/0315384 A1 | 12/2010 | Hargreaves et al. |
| 2011/0017838 A1* | 1/2011 | Delbaere .............. G02B 5/3016 |
| | | 235/494 |
| 2011/0162894 A1 | 7/2011 | Weber |
| 2011/0164000 A1 | 7/2011 | Pance |
| 2011/0221712 A1 | 9/2011 | Liang |
| 2011/0273376 A1 | 11/2011 | Dickinson et al. |
| 2011/0285670 A1 | 11/2011 | Li et al. |
| 2011/0291986 A1 | 12/2011 | Rebeschi et al. |
| 2012/0062497 A1* | 3/2012 | Rebeschi et al. ............. 345/174 |
| 2012/0098798 A1 | 4/2012 | Lee |
| 2012/0113065 A1 | 5/2012 | Chin |
| 2012/0228039 A1 | 9/2012 | Hinson et al. |
| 2013/0009907 A1 | 1/2013 | Rosenberg et al. |
| 2013/0050080 A1 | 2/2013 | Dahl et al. |
| 2013/0135220 A1 | 5/2013 | Alameh et al. |
| 2014/0078070 A1 | 3/2014 | Armstrong-Muntner |
| 2014/0078109 A1 | 3/2014 | Armstrong-Muntner |

* cited by examiner

OPTICAL STYLUS

FIELD OF TECHNOLOGY

The present invention relates generally to user input systems for computing devices and, more particularly, to an optical stylus for providing input.

BACKGROUND

User input may be provided to a computing device in a variety of different ways. Common examples include a keyboard, a mouse, a trackpad, a stylus, a camera, a microphone and the like. Some computing devices allow for user input via a display screen, such as for touch screen devices. The touch screens allow for a user to interact directly with displayed objects without the use of a cursor or other input device.

There are many different types of touch sensing technologies that may be implemented in a touch screen. In some embodiments, a capacitive touch screen may be implemented which relies on changes in capacitive measurements to determine when a user is providing input. One capacitive-type touch screen, in particular, may rely upon interaction with another capacitive member in order to sense contact with its surface as an input. As such, fingers may generally be used, but plastic devices (e.g., styluses) are ineffective to register input. Moreover, a capacitive member configured to register an input with these types of touch screens is the same size of a finger tip providing for imprecise input.

SUMMARY

In some embodiments, a stylus is provided with an optical sensor, such as a camera, that is used in determining a location and movement of the stylus relative to a touch screen display of a computing device. It should be appreciated, however, that displays other than touch screens may be implemented in some embodiments. The optical stylus may be configured to transmit the location and movement to the computing device. In some embodiments, the optical stylus may be configured to process and/or filter the location and movement information prior to transmission, whereas in other embodiments, raw data may be transmitted.

In some embodiments, the relative position of the optical stylus may be determined based on indicia detectable by the optical stylus. The indicia may further be used in determining the movement of the optical stylus. The indicia may include pixel dependent indicia that are communicated via the pixels displayed by the touch screen or physical or permanent indicia that are physically present on or in the screen or otherwise positioned such that the optical stylus may detect them. Generally, the indicia are imperceptible to the human eye. As such, the touch screen may be encoded without diminishing or otherwise interfering with images displayed on the touch screen.

In some embodiments, the optical stylus may be configured to determine when the stylus is in contact with the touch screen. For example, in some embodiments, the stylus may include a pressure sensor that may be used to determine when the optical stylus is in contact with the touch screen. In some embodiments, the optical stylus may implement optical sensors to determine when contact is made.

The optical stylus may include one or more orientation determining sensors, such as accelerometers and/or gyroscopes. For example, the optical stylus may include an accelerometer. The accelerometer may be configured to aid in movement determinations, as well as a orientation. In particular, the accelerometer may allow for a determination to be made as to a particular angle at which the stylus is being held relative to the surface of the touch screen.

While multiple embodiments are disclosed, still other embodiments of the present invention will become apparent to those skilled in the art from the following Detailed Description. As will be realized, the embodiments are capable of modifications in various aspects, all without departing from the spirit and scope of the embodiments. Accordingly, the drawings and detailed description are to be regarded as illustrative in nature and not restrictive.

DETAILED DESCRIPTION

Embodiments discussed herein may take the form of, or operate with, an optical stylus that allows for position-based sense writing on a touch screen display. The contact of the optical stylus with the touch screen may be differentiated from input from a hand or finger. The optical stylus works in addition to capacitive sensing, may provided sub-millimeter scale resolution and, in some embodiments, may have a pointed tip to provide precision input. Additionally, the stylus operates independent of an orientation or rotation of the stylus and/or screen. In some embodiments, the stylus may be pressure sensitive and may communicate data to a host device wirelessly.

The optical stylus is provided with an optical sensor or camera that may determine a relative location, angle and/or movement of the stylus with respect to a display a computing device. In some embodiments, the display may be a touch screen display, such as a capacitive touch screen. The optical stylus may be configured to transmit the location, angle and movement to the computing device. In some embodiments, the optical stylus may be configured to process and/or filter the location and movement information prior to transmission, whereas in other embodiments, raw data may be transmitted.

The relative position of the optical stylus may be determined based on indicia detectable by the optical stylus. The indicia may further be used in determining the movement of the optical stylus. These indicia may be, for example, pixel-dependent patterns that are graphically presented on the touch screen. Alternatively, the indicia may be physical or permanent markings or patterns that are incorporated into the screen, or are otherwise positioned such that the optical stylus may detect them. Generally, the indicia are imperceptible to the human eye. As such, the touch screen may be encoded without diminishing or otherwise interfering with images displayed on the touch screen.

In some embodiments, the optical stylus may be configured to determine when the stylus is in contact with the touch screen. For example, in some embodiments, the stylus may include a pressure sensor that may be used to determine when the optical stylus is in contact with the touch screen. In some embodiments, the optical stylus may implement optical sensors to determine when contact is made. That is, in some embodiments, the camera may be used to determine if contact has been made with an encoded display.

The optical stylus may include one or more orientation sensors, such as accelerometers and/or gyroscopes. For example, the optical stylus may include an accelerometer. The accelerometer may be configured to aid in movement determinations, as well as in determining orientation. In particular, the accelerometer may allow for a determination to be made as to a particular angle at which the stylus is being held relative to the surface of the touch screen. Moreover, in some embodiments, the orientation of the stylus relative to a display may be determined, at least in part, using information collected by the camera, such as using the aspect ratio of the patterns or markings being imaged.

Figure 1:
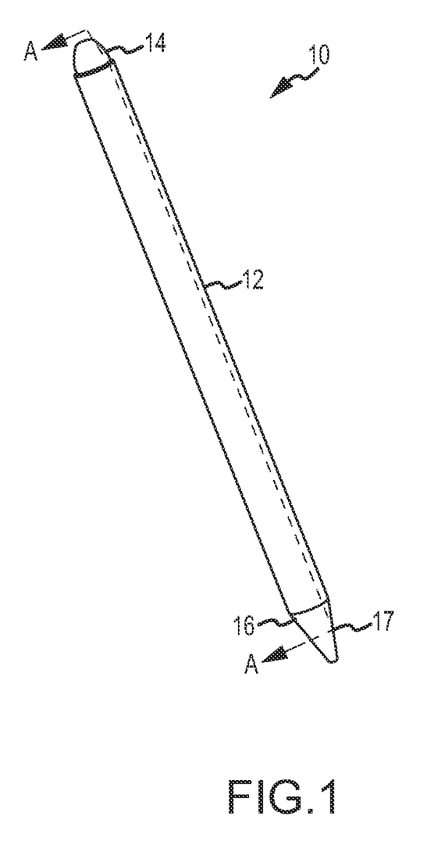
FIG. 1 illustrates an optical stylus in accordance with an example embodiment.

Turning now to the drawings and referring initially to FIG. 1, an optical stylus 10 is illustrated in accordance with an example embodiment. The stylus 10 may take one of various different forms to facilitate use by a user. In the illustrated example, the stylus 10 has the general form of a pen. Accordingly, the stylus 10 includes a body 12 and end covers 14 and 16. One end cover 14 is configured to allow for communicative transmissions to a host device, while the other end cover 16 is configured to contact the host device and/or an input/output device of the host. The body 12 may be made of a suitable material such as a metal, alloy, plastic, composite, or other suitable material. The end covers 14 and 16 maybe made of any material suitable to the purposes thereof. Specifically, the end cover 14 configured to allow for communicative transmissions may be a radio frequency (RF) transparent material, such as a plastic in some embodiments. In some embodiments, the end cover 14 may be configured as a signal diffuser to diffuse an infrared (IR) signal, for example. The end cover 16 may be made of a plastic material or other material that will generally not be likely to scratch or damage a display screen of the host. Additionally, the end cover 16 may taper to a point 17, similar to a pen, so that a user may control the stylus 10 and the input provided by the stylus with precision. In some embodiments, one or more of the end covers 14 and 16 may be unitary with the body 12. For example, the cover 16 maybe formed of the same material as the body 12 and during the same process.

Figure 2:
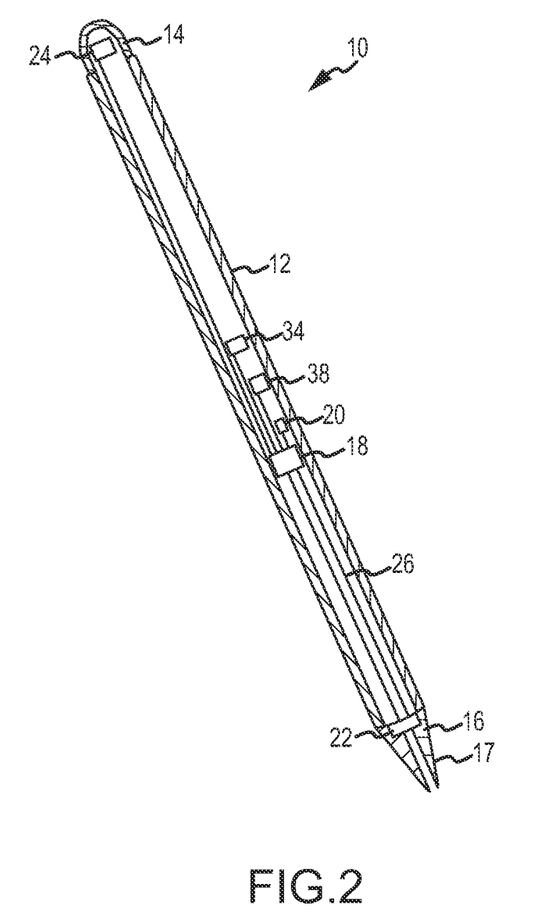
FIG. 2 illustrates a cross-sectional view of the optical stylus of FIG. 1 along line AA.

FIG. 2 illustrates an example cross-sectional view of the stylus 10 of FIG. 1 along line AA. As shown in this example, a camera 18 may be positioned within the body 12 of the stylus. The camera 18 may be a suitable light sensor for the purposes described herein. In some embodiments, the camera 18 includes a charge-coupled device (CCD) sensor. Additionally, in some embodiments, a light source 20 may be provided. The light source 20 may include one or more light emitting diodes. In some embodiments, the light source 20 may emit in a non-visible portion of the electromagnetic spectrum, such as the IR spectrum.

A pressure sensor 22 may be located under, adjacent to or coupled with the end cover 16, in some embodiments. In particular, as illustrated, in some embodiments, the pressure sensor 22 may be located between the end cover 16 and the body 12 of the stylus 10. In other embodiments, the pressure sensor 22 may be positioned near the point 17 of the end cover 16. In some embodiments, the pressure sensor may be located in other parts of the body of the stylus and may be mechanically coupled to devices and/or members to effectuate the sensing of pressure.

In some embodiments, the pressure sensor may serve as a trigger for the capture, processing and/or transmission of location indicative images by the camera of the stylus. That is, the camera in the stylus 10 may take images of the pattern(s) on the touch screen in response to the pressure sensor registering an indication of pressure being applied to the tip of the stylus. In alternative embodiments, the tip may have a capacitive sensor therein and the stylus camera may capture images when the capacitive sensor detects a change in capacitance (presumably from coupling to a capacitive touch screen). In yet another embodiment, the computing device may be touch or pressure sensitive and may instruct the stylus to capture an image via a communication link between the device and stylus. Such instruction may be sent when the computing device registers a pressure or capacitive touch roughly corresponding to a pressure or capacitive profile of the stylus.

An antenna 24 is also provided to allow for the stylus to wirelessly transmit information to a host. The antenna 24 may be located any suitable location within the stylus 10 and, in some embodiments, may be located at an end opposite the point 17. Additionally, the stylus 10 may include an accelerometer(s) 36 and/or gyroscope 38 in some embodiments.

Figure 3:
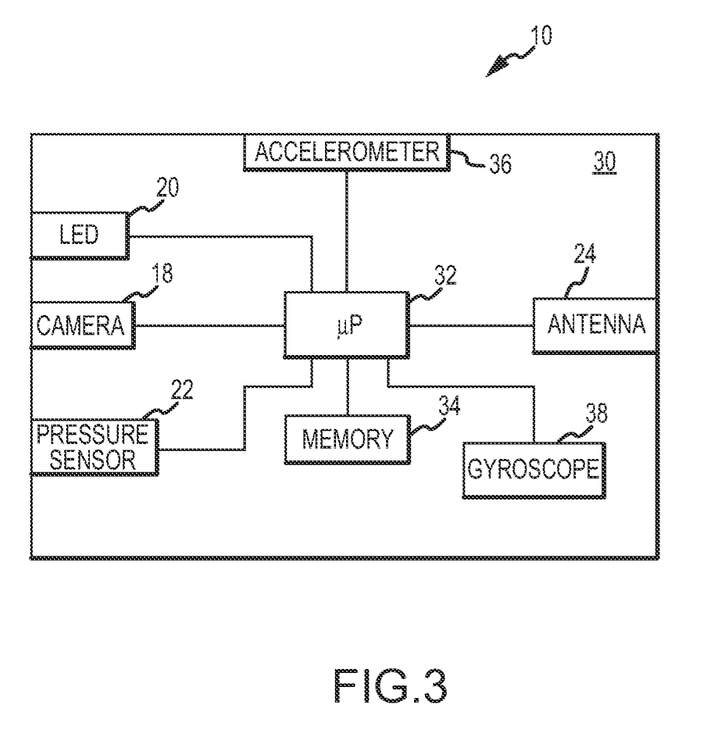
FIG. 3 is a block diagram of the optical stylus of FIG. 1.

FIG. 3 is a block diagram of the optical stylus 10 in accordance with an example embodiment. Other embodiments may include more, fewer and/or different components. In some embodiments, the components may be mounted on a printed circuit board (PCB) 30 that may be positioned within the stylus 10. In other embodiments, some components may be mounted on the PCB 30 and others not. In some embodiments, one or more components may be mounted to the interior sidewalls of the stylus 10.

As illustrated, a microprocessor 32 may be coupled to each of the camera 18, the LED 20, the pressure sensor 22 and the antenna 24. In some embodiments, the microprocessor 32 may be configured to receive data from the components and transmit the raw data via the antenna 24 to a host. In other embodiments, the microprocessor 32 may be configured to filter and/or manipulate the data before transmitting the data to a host. For example, in some embodiments the microprocessor 32 may compute a directional vector and/or interpret patterns that have been perceived by the camera 18. Additionally, the microprocessor 32 may be coupled to a memory 34. The memory 34 may be configured to store operating instructions for the microprocessor 32. In some embodiments, the memory 34 may be configured to store data received from the components.

In some embodiments, one or more accelerometer(s) 36 may be provided within the stylus as well as a gyroscope 38. The accelerometer(s) 36 and gyroscope may be useful in determining the orientation of the stylus 10 and/or any movement of the stylus. The orientation and movement information provided by the accelerometer(s) 36 and the gyroscope 38 may be used for determining orientation and movement of the stylus relative to a host device.

Figure 4:
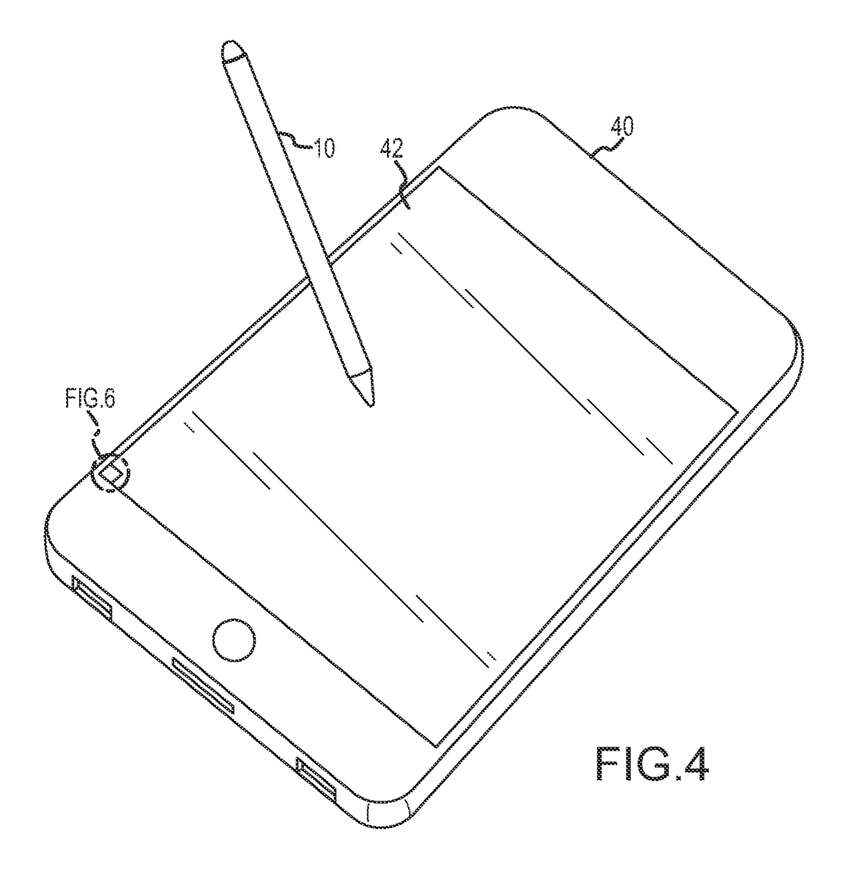
FIG. 4 illustrates the optical stylus of FIG. 1 with a host computing system.

FIG. 4 illustrates the stylus 10 and a tablet computing device 40. The tablet computing device 40 may serve as a host device for the operation of optical stylus 10. As such, the table computing device may be referred to herein as a "host", a "host computing device," a "host system," or the like. Additionally, although the tablet computing device is illustrated and described herein, it should be appreciated that other host devices may be used in conjunction with the optical stylus 10. As such, the tablet computing device 40 is merely provided as an example.

The tablet computing device 40 may have a touch sensitive display 42 that provides a visual output to a user and may receive input from the user. Generally, the touch sensitive display 42 does not detect contact by the stylus 10. In particular, contact by the stylus 10 on the surface of the display 42 may not register as an input to the device 40. Rather, the stylus 10 may provide input to the device 40 via a wireless communication channel, such as an RF channel, an IR channel, or the like.

Patterns encoded on the surface of the display 42 or generated by the display 42 may be used to determine the location of any contact the stylus 10 makes with the display. In particular, the stylus 10 may capture images of the encoded patterns to either determine its relative location on the display 42 or may transmit image data to the device 40 so that the device may determine the location of the stylus contact.

A pattern, design and/or code may be provided that is not visible to a human eye, but may be captured by the camera of the stylus 10 to determine the relative location of the stylus 10 relative to the display 42. In some embodiments, the pattern may take the form of a QR code, a 2D code, a bar code and/or one or more other suitable encoding format.

In some embodiments, the pattern may be physically present in a layer positioned on or over the display. For example, the pattern may be created by lasers making dots or surface blemishes below a certain size that cannot be seen (e.g., approximately five microns in diameter). In some embodiments, an acid, chemical etch, or chemical deposition may be used to create the pattern.

In still other embodiments, the pattern may be created in a certain wavelength of light imperceptible to humans and the camera in the stylus 10 may be configured to capture light in a range that includes that wavelength. For example, the patterns may be printed with IR ink on glass. In some embodiments, the pattern may be created using a micropolarizer and the camera may have a polarizing filter to detect the pattern. For yet other embodiments, the polarization may include using patterned birefringent Indium-tin oxide (ITO) layer. In some embodiments, near field optics may be implemented to encode the display surface. In particular, small focal length optics near the pixels may be used.

In other embodiments, the pattern may be pixel based. That is, the pattern may be created by pixels illuminated in the display 42. In some embodiments, the pixels may generate the pattern in colors and/or at a rate that they do not impact a visual effect or graphic being shown on the display 42. In some embodiments, small variations in color may be provided using human eye color response mismatch to allow the changes to be imperceptible to the human eye. In some embodiments, small variations in pixel brightness may be used to encode location information. For example, in some embodiments, every third or fourth pixel may be change either its color, hue or the like imperceptibly to provide location information. That is, the pixel changes may be implemented to create a pattern perceivable by a camera but not to a human eye. In some embodiments, this may be due to the color change and/or the frequency at which the change takes place. In some embodiments, a gradient may be applied to the pixels to encode them with location information.

In some embodiments, the pixels may modulate to use the relatively slow temporal response of human eyes compared to the camera to hide the encoding from human observation. Fast modulation of the pixel between two states can appear to be the state in between. That is, a bright and dim modulation of a pixel make a medium pixel brightness, a red and blue modulation make a magenta pixel color, and so forth. The rapid changes can be captured by the camera, while the eye is incapable of resolving the changes and instead sees an average of the states. In some embodiments, the polarity of the light may be modulated to indicate location. That is, a layer that can dynamically change polarization at a pixel level can be used to employ a similar scheme. The camera can capture fast changes in the polarization, but the human eye does not see the changes.

It should be appreciated that one or more techniques may be implemented to encode location information for capture by the camera of the stylus 10. In some embodiments, light from the stylus 10 may be used to allow the pattern to be captured by the camera. Alternately or in addition, light from the display 42 may be used to enable and/or improve detection of the patterns by the camera. Each technique may be implemented in a manner that is imperceptible to a user. As one example, the light may be infrared light to illuminate an infrared pattern. As yet another example, the camera in the stylus may be particularly sensitive to changes in brightness and/or intensity of the pixels, to the extent that it may perceive changes that lie below the threshold of the human eye to perceive.

Figure 5:
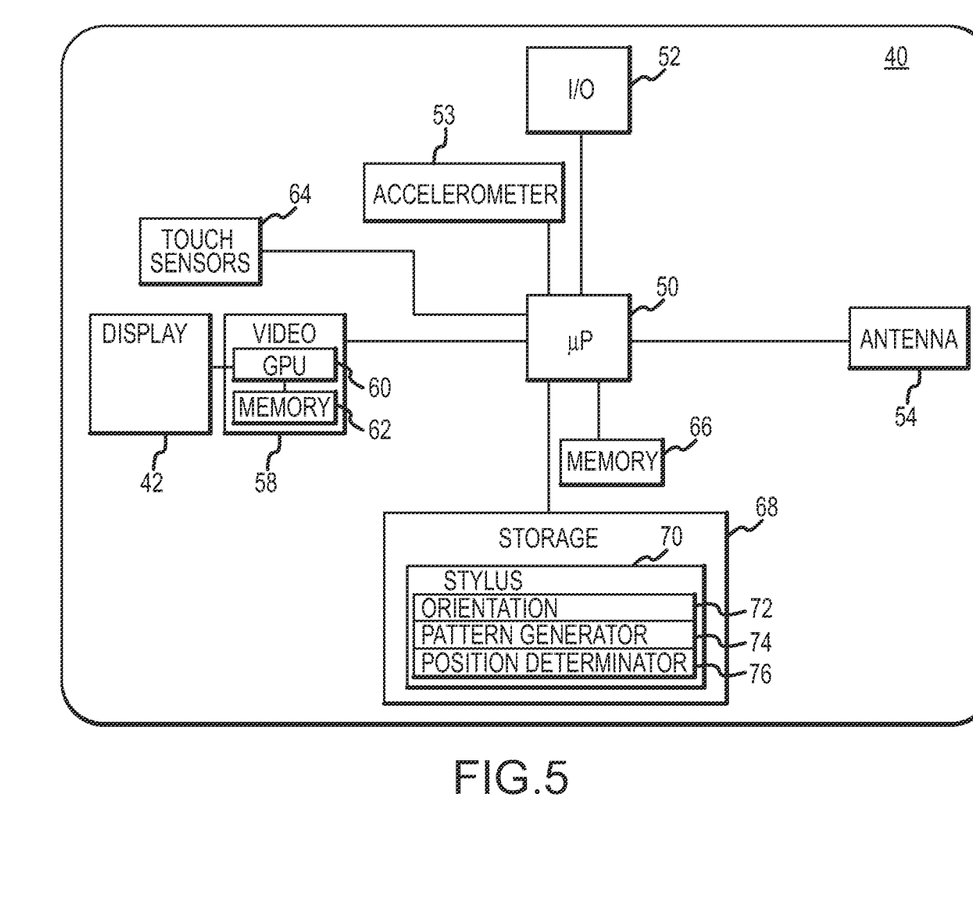
FIG. 5 is a block diagram of the host computing system of FIG. 4.

FIG. 5 illustrates a block diagram of the tablet computing device 40 in accordance with an example embodiment. The tablet computing device 40 includes a processor 50. In some embodiments, the processor 50 may include one or more processors and/or one or more processors having multiple processing cores. The device 40 may provide one or more input/output modes 52. The device 40 may include one or more accelerometers 53 and/or gyroscopes. The device 40 may also include one or more antenna(s) 54. The antenna(s) 54 may be configured to receive communications from the stylus 10.

Additionally, the device 40 includes the 42. In some embodiments, the display 42 may take the form of a flat panel, graphic display, such as a liquid crystal display, or an organic light emitting diode display. In some embodiments, the display may have dedicated components 58 to help improve the rendering of graphics and/or to off load graphics processing from the processor 50. For example, a graphics processing unit 60 may be provided in some embodiments with a dedicated memory 62 for graphics rendering. Additionally, touch sensors 64 are provided so that the display is enabled as a touch screen display. In some embodiments, the touch sensor 64 may be capacitive touch sensors configured to sense contact by a conductive material, such as a finger.

A memory 66 is coupled to the processor 50. In some embodiments, the memory 66 may take the form of a random access memory (RAM), dynamic RAM, static RAM, or any other suitable type of memory including flash memory and read-only memory, for example. A storage memory 68 may also be coupled to the processor 50 and may be any suitable storage memory, such as a hard disk drive, semiconductor disk drive, tape drive, flash drive, etc. The storage memory 68 may store data, applications, programs, and/or an operating system for the device 40.

More particularly, the storage memory 68 may store programs related to the use of the optical stylus 10 as an input device for the device 40. For example, in some embodiments, the storage memory 68 may include stylus programs 70 related to the operation and interaction with the stylus 10 including routines for orientation 72, pattern generation 74, and position determination 76. In some embodiments, the orientation routine 72 may be directed to determining the orientation of the stylus 10 relative to the display 42. For example, data from the accelerometer of the stylus 10 may be compared with data from an accelerometer 53 of the device 40 to determine a relative angle of the stylus to the surface of the display.

The pattern generator routine 74 may be directed to generating a position indicating pattern with pixels shown on the display 42. The patterns generated by the generator 74 may be detected by the stylus 10 in order to determine the position of the stylus on the surface of the display.

The position determiner routine 76 may be used in conjunction with input from the stylus to determine the position of the stylus on the surface of the display 42. In some embodiments, the position determiner routine 76 may be configured to utilize patterns captured by the stylus to determine the position of the stylus.

Figure 6:
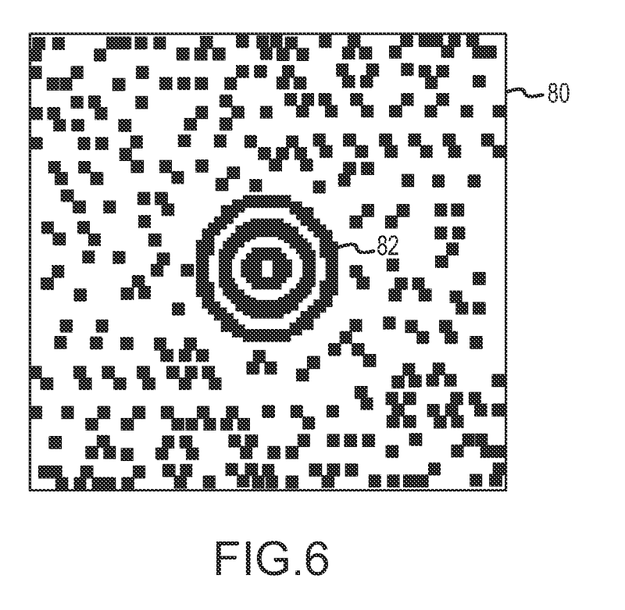
FIG. 6 illustrates an example location indicative encoding which may be displayed or provided by the host computing system of FIG. 4.

FIG. 6 illustrates an example pattern 80 that may be displayed by the display 42 of the device or may be provided on a physical layer over the display. It should be appreciated, that many different patterns may be provided across a surface of the host device so that they are indicative of a particular location. As such, FIG. 6 is illustrative of only a very small portion of a encoded patterned surface.

As discussed above, the pattern 80 may be imperceptible to a user, but may be captured by the stylus 10. In some embodiments, the pattern may be encoded to provide relative positioning information. The pattern 80 is encoded with details as to its location on the display 42. That is, the pattern 80 may include x, y coordinates that may be read by the stylus. As long as the stylus is able to capture an image of the pattern 80, the location of the stylus relative to the surface of the display 42 may be determined. For example, the stylus may transmit the code or the location information to the device so that the device may know where the stylus is pointing relative to the surface of the display 42.

Additionally, in some embodiments, the pattern 80 may be encoded to provide orientation information so that the orientation of the stylus relative to the pattern may be discerned. In some embodiments, the pattern 80 may be rotation independent. In some embodiments, the pattern may be a barcode, such as a 2D barcode, a quick response (QR) barcode or may implement other encoding techniques.

Figure 7:
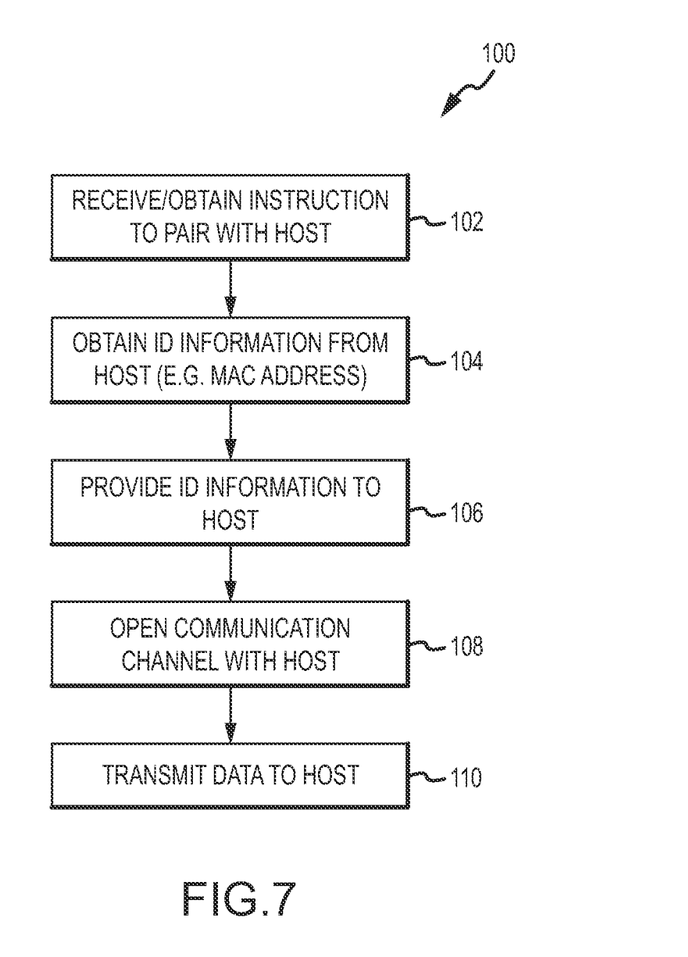
FIG. 7 is a flow chart illustrating a method for pairing the optical stylus of FIG. 1 with the host computing system of FIG. 4.

FIG. 7 is a flow chart illustrating a method 100 for pairing of the stylus 10 with a host, such as computing device 40. Initially, the stylus receives an instruction to pair with a host (Block 102). The instruction to pair with a host may be given in any suitable manner. For example, in some embodiments, a user may swipe the stylus across a particular portion of the screen where an initiation pattern may be located. In some embodiments, a particular movement of the stylus may be used as an initiation instruction. For example, the user may wave the stylus in a particular pattern that would be sensed by the stylus' accelerometers and interpret the motion as an initiation signal. In some embodiments, a button may be provided that initiates pairing when depressed.

Upon initiation of the pairing, the stylus 10 may obtain identifying (ID) information about the host (Block 104). For example, in some embodiments, the stylus 10 may request information from the host such as a media access control (MAC) address, or other unique identifier. In some embodiments, identifying information may be encoded in the display and, thus, may be detected by the stylus 10. The stylus 10 may also provide identifying information to the host (Block 106) and a communication channel may be opened between the stylus and host (Block 108).

It should be appreciated that the ID information may take different forms in different embodiments. Moreover, the ID information may be used in a way that allows for the communications between the paired devices to be recognized by each device. For example, in some embodiments, the host's ID information may be included in packets transmitted by the stylus 10. In some embodiments, the ID information may include encryption keys that may be exchanged and used to encrypt transmissions to help secure the communications between the paired devices. In some embodiments, the ID information may be obtained by capturing and image of the device or a portion of the host device that may be used to identify the host.

Upon opening the communication channel, the stylus may transmit data to the host (Block 110). In particular, the stylus 10 may transmit data collected by its camera, accelerometer, pressure sensor and so forth, to allow the host to determine the position of the stylus. In some embodiments, the stylus may be configured to transmit raw data, while in other embodiments, the stylus may transmit processed data (e.g., relative position data).

In some embodiments, the opening of the communication channel may trigger the display of encoded location indicia on the display of the host. Specifically, in some embodiments, the host may not continuously display encoded location indicia unless the host is paired for use with the stylus 10. Once paired with the stylus 10, the host may generate location indicia that may be captured by the camera of the stylus 10 but are imperceptible to a user.

Figure 8:
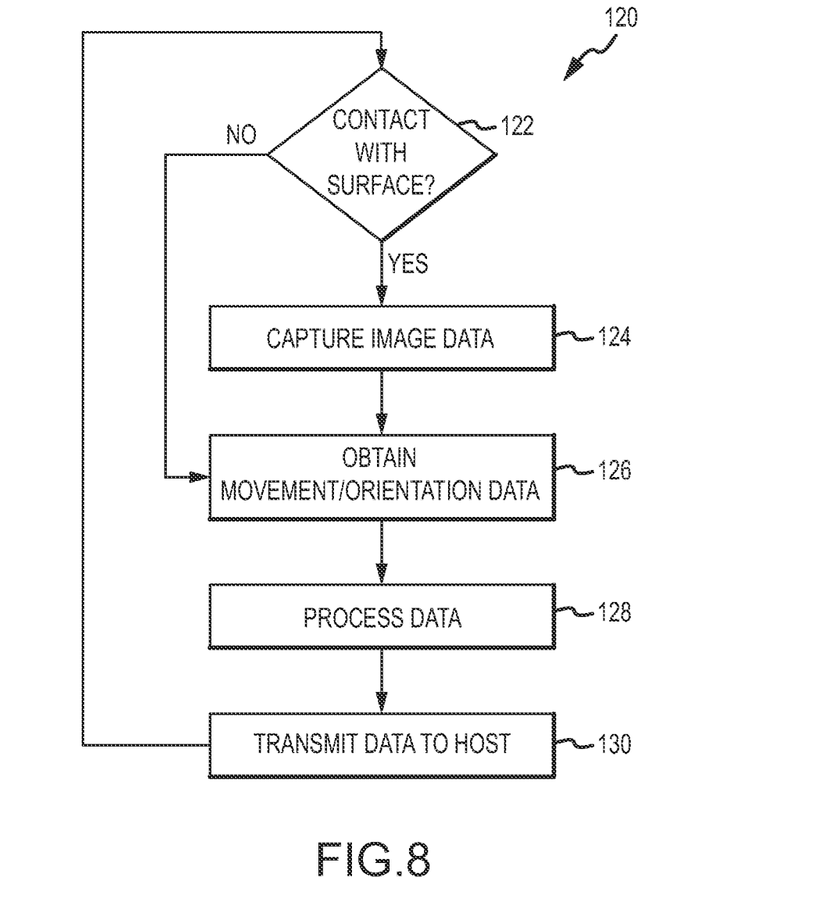
FIG. 8 is a flow chart illustrating a method of operating the optical stylus of FIG. 1.

FIG. 8 is a flowchart illustrating a method 120 for operation of the stylus 10. The method 120 may begin by determining if the stylus 10 is in contact with a surface (Block 122). If it is determined that the stylus is in contact with the surface, image data is captured (Block 124). In some embodiments, movement and/or orientation data is obtained also (Block 126). The captured image data and the movement/orientation data may be processed by the stylus (Block 128) and the data may be transmitted to the host (Block 130). In some embodiments, some or all of the data is not processed but transmitted in a raw form to the host. For example, in some embodiments the movement/orientation information may be processed before transmission while the image data is transmitted in a raw form. In some embodiments, the stylus 10 may be configured to receive orientation information from the host and may use that information to determine its orientation relative to the host and transmit a relative position to the host.

Generally, as long as the stylus 10 remains in contact with the surface, image data will continuously be collected and transmitted to the host. It should be appreciated that the pressure sensor may be used in some embodiments to determine if the stylus is in contact with a surface. In some embodiments, however, other techniques may be used to determine if the stylus 10 is in contact with a surface. For example, resolution, size and/or ability to perceive the encoded data may be used to determine if the stylus 10 is in contact with the surface. In some embodiments, the camera of the stylus 10 may have a focal length that provides for clean capture of the encoded patterns when the stylus is in contact with the surface and otherwise may be unable to capture a meaningful image of the pattern.

In some embodiments, if it is determined that the stylus 10 is not in contact with the surface, movement and/or orientation data may still be obtained (Block 124). Additionally, it should be appreciated that, in some embodiments, movement and orientation information may be determined from the image data.

Figure 9:
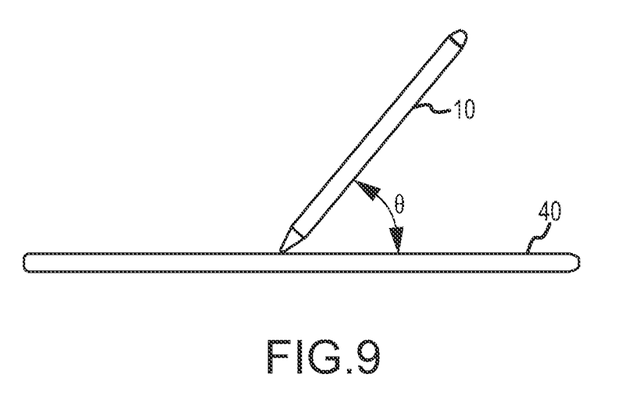
FIG. 9 illustrates a side-view of the optical stylus of FIG. 1 with the host computing system of FIG. 4.

FIG. 9 illustrates the stylus 10 interacting with the surface of the device 40. As illustrated, the stylus 10 is held at an angle θ relative to the surface of the device 40. The angle θ may cause the encoded pattern to be skewed when captured by the stylus 10. In particular, portions of the pattern further away from the stylus 10 may appear smaller. Additionally, the portion of the pattern captured by the stylus 10 may indicate the angle θ and the direction at which the stylus is oriented relative to the host 40. That is, because of the angle θ the image of the pattern may be used to determine the direction that the stylus 10 held relative to the host 40 and the angle θ may be approximated also. Any movement of the stylus 10 will alter the portion of the pattern that is captured and represented in an image. Therefore, the orientation and movement of the stylus 10 relative to the surface of the host 40 may be determined from the captured image.

Moreover, because of the angle θ of the camera relative to the pattern, parallax may occur or the perception of the pattern may be skewed. In particular, portions of the pattern that are closer to the stylus may appear larger than those that are further from the stylus. As such, a square pattern may be captured as a trapezoid, for example. In some embodiments, pattern recognition software may be implemented in order to recognize the pattern or to correct any skewing of the pattern due to the angle at which the stylus is held relative to the display.

In some embodiments, information obtained from the accelerometer and/or gyroscope of the stylus may be used to determine the relative angle of the stylus and, thus, facilitate reconstruction of the captured pattern from a skewed pattern. Additionally, in some embodiments, the accelerometer and/or gyroscope information may be used to determine the relative orientation of the stylus to the display 42 so that obtained patterns may be reconstructed and/or interpreted properly. That is, for example, if a pattern is captured upside down (because of the orientation of the display or the stylus), the pattern may be read/interpreted right side up. Moreover, in some embodiments, the patterns themselves may include orientation information that may be used to correct for any orientation differential between the stylus and the display. For example, each code may include a particular feature (e.g., pattern or color change) that indicates an orientation of the pattern (such as a top of a pattern or a particular corner of the pattern).

Figure 10:
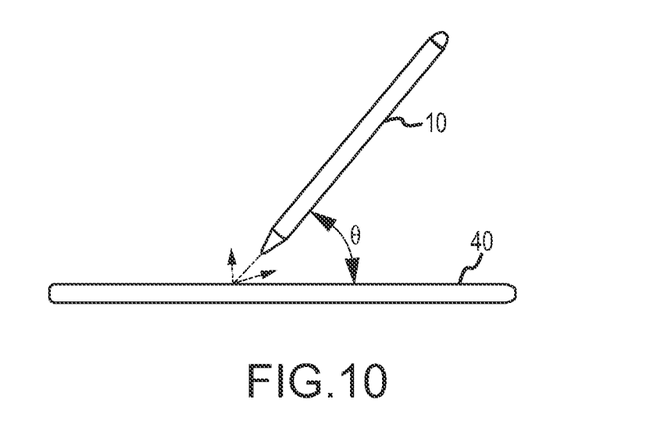
FIG. 10 illustrates another side-view of the optical stylus of FIG. 1 with the host computing system of FIG. 4 with the host computing system refracting a monochromatic light from the stylus.

FIG. 10 illustrates an embodiment with the stylus 10 emitting a monochromatic light directed at the surface of the host 40 having a birefringent ITO that reflects light back toward the stylus. The reflected light is refracted so that it has a different wavelength than the monochromatic light that was transmitted. The wavelengths of light that are captured by the stylus 10 may be used to determine the distance of the stylus from the surface of the host 40 and/or the angle θ of the stylus relative to the host 40.

The foregoing discussion describes some example embodiments of an optical stylus and a host computing system. Although the foregoing discussion has presented specific embodiments, persons skilled in the art will recognize that changes may be made in form and detail without departing from the spirit and scope of the embodiments to achieve the similar security provided by the embodiments disclosed herein. Accordingly, the specific embodiments described herein should be understood as examples and not limiting the scope of the disclosure.

The invention claimed is:

1. An optical stylus for use with a host device having at least one display, wherein the at least one display comprises an array of pixels that emit light and a layer of transparent conductive material, the optical stylus comprising:
   a light source that emits monochromatic light onto the layer of transparent conductive material, wherein the monochromatic light is reflected by the layer of transparent conductive material as light having a different wavelength than the monochromatic light;
   an image capture device, wherein the image capture device is configured to obtain an image of an encoded, location indicative pattern from the at least one display of the host device, wherein the location indicative pattern is encoded in the light emitted by the array of pixels, and wherein the image capture device is configured to capture the light reflected by the layer of transparent conductive material;
   a processor coupled to the image capture device;
   one or more orientation determining components coupled to the processor;
   a pressure sensor coupled to the processor and configured to sense pressure applied to an end of the stylus; and
   an antenna coupled to the processor, wherein the antenna is configured to transmit data collected by the optical stylus to the host device;
   wherein the processor determines an angle of the image capture device relative to the at least one display of the host device based on the wavelength of the reflected light that is captured by the image capture device.

2. The optical stylus of claim 1, wherein the processor is configured to actuate the image capture device upon receiving signals from the pressure sensor indicative of pressure being applied at the end of the stylus.

3. The optical stylus of claim 1, wherein the processor is configured to transmit the data collected by the optical stylus while receiving signals from the pressure sensor indicative of pressure being applied at the end of the stylus.

4. The optical stylus of claim 1, wherein the one or more orientation determining components comprise at least one accelerometer.

5. The optical stylus of claim 1, wherein the stylus is configured to transmit raw data to the host computing system.

6. The optical stylus of claim 1, wherein the encoded, location indicative pattern comprises a quick response barcode.

7. A method of operating an optical stylus comprising:
   determining when the optical stylus is in contact with a surface of at least one display of a host system based at least in part on signals received by a processor from a pressure sensor of the optical stylus;
   establishing a wireless communications channel between the optical stylus and the host system;
   in response to establishing the wireless communications channel, emitting a location indicative pattern of modulated light with the at least one display of the host system;
   capturing a plurality of images of the location indicative pattern of modulated light emitted from the display while the optical stylus is in contact with the surface of the at least one display of the host system using a camera of the optical stylus;

determining an angle of the optical stylus relative to the at least one display of the host system based on the modulated light and a skew of at least one of the images; and transmitting the at least one of the images to the host system.

8. The method of claim 7 further comprising: obtaining orientation information while the optical stylus is in contact with the surface; and transmitting the orientation information to the host system.

9. The method of claim 7 further comprising: receiving host orientation information from the host system; and computing a relative orientation from the host orientation information and the orientation information of the optical stylus.

10. The method of claim 7 further comprising: obtaining orientation information while the optical stylus is not in contact with the surface; and transmitting the orientation information to the host system.

11. The method of claim 7 further comprising processing the at least one of the images to determine relative positioning of the optical stylus relative to the surface.

12. The method of claim 7 further comprising: receiving an indication to pair with the host system; obtaining identifying information from the host system; and establishing the wireless communications channel with the host system.

13. The method of claim 7 further comprising encoding the at least one of the images for transmission.

14. The method of claim 7 further comprising determining the angle of the optical stylus relative to the surface.

* * * * *

UNITED STATES PATENT AND TRADEMARK OFFICE
CERTIFICATE OF CORRECTION

PATENT NO. : 9,639,178 B2  
APPLICATION NO. : 12/950848  
DATED : May 2, 2017  
INVENTOR(S) : David Amm et al.

Page 1 of 1

It is certified that error appears in the above-identified patent and that said Letters Patent is hereby corrected as shown below:

In the Claims

In Claim 9, Line 1, "The method of claim 7" should read -- The method of claim 8 --.

Signed and Sealed this
Twenty-sixth Day of September, 2017

Joseph Matal
*Performing the Functions and Duties of the
Under Secretary of Commerce for Intellectual Property and
Director of the United States Patent and Trademark Office*